INVENTOR
ALEX BAGDASARIAN

INVENTOR
ALEX BAGDASARIAN
BY Richard P. Crowley
ATTORNEY

United States Patent Office 3,615,061
Patented Oct. 26, 1971

3,615,061
INSTANTANEOUS CORRECTIVE RESPONSE
DRIVE MECHANISM FOR CONTINUOUS
FILM PROCESSORS
Alex Bagdasarian, Arlington, Mass., assignor to Artisan
Industries Inc., Waltham, Mass.
Continuation-in-part of application Ser. No. 620,703,
Mar. 6, 1967. This application June 24, 1969, Ser.
No. 840,127
Int. Cl. B65h 17/42; G03d 3/12
U.S. Cl. 242—55.01
32 Claims

ABSTRACT OF THE DISCLOSURE

An improved film transport device for transporting film or other strip material, which device includes a rack having a top driven shaft and a plurality of primary overdriven spools thereon. Spaced apart from the shaft is a fixed shaft having a plurality of idle spools thereon. The overdriven and idle spools define a plurality of loop-to-loop arrangements of film material. Spaced apart from the overdriven spools is a continuously driven friction drive roller. During normal operating conditions, the film is moved through the loop-to-loop arrangement by the overdriven spools, and the friction drive roller does not engage said spools. When an increase in film tension is felt within the loop-to-loop arrangement, there is engagement between the overdriven spools and the friction drive roller whereby additional overdriving force is imparted to said overdriven spools to relieve the increase in film tension.

PRIOR COPENDING APPLICATION

This application is a continuation in part of Ser. No. 620,703, filed Mar. 6, 1967, now abandoned.

BACKGROUND OF THE INVENTION

My invention relates to a transport device for processing continuous strip material such as movie film.

Continuous motion picture processing machines today are built upon the basic principle of transporting film through a series of wet and dry processing tanks with the film transport devices being in usual identical banks which are commonly referred to as racks or banks. Whatever the mode of transportation used such as bottom friction drive, top friction drive, top tendency drive, sprocket drive or the like, the individual banks are usually of the same design in any machine from beginning to end. In the wet section of any continuous processing machine, the banks are generally identical and in the dry cabinet if they are not identical they may perhaps be a little longer, but essentially of the same design. The larger and faster the processor, the more critical the design criteria required in the film transport device to guard against film breaks due to varying tension between racks and within racks. The film breaks are generally caused by shrinkage or expansion of film, bearing failure, and a loose strand of film not taken up fast enough. However, the primary reason for film breakage is usually the difference in frictional tension in the spools in different racks, caused by the racks being in different solutions, with an attendant lack of film compensation due to a lack of a reasonable fast rate of corrective response between such racks.

With the advent of single 8 mm. films, particularly 8 mm. color film, present 16 mm. and 35 mm. designs are generally inadequate for the running of this very small width film at reasonably fast and economical speeds. New and improved devices must be provided for more rapid and immediate corrective response between racks while maintaining more uniform film tension within each individual rack. This rapid rate of corrective response is necessary in order to safely process the narrow super 8 mm. film at economical high speeds, to control accurately the exposure or processing residence time within a rack and for the use of viscous and spray methods of processing.

Current methods provide for corrective responses to changes in film tension between racks, but the film tension within an individual rack may vary widely with the loops of film increasing and decreasing collectively or individually. One method provides individual drive means for each of the film loops (see U.S. Pat. No. 2,123,445). When the film shortens and the tension increases the spool contacts the drive roller and film is taken from the next loop. Thus, the corrective response is from loop to loop within the rack. This method is disadvantageous in that tension in each loop may vary widely causing hesitation because in this design individual spools are constantly dancing, that is engaging, positive drive and disengaging, no drive, with the drive rollers. When the tension in a loop increases the rack draws its reserve from the preceding rack and that rack will draw reserve from the next preceding rack and so on down the line to the feed section. If, during the drawing of reserve from rack to rack, a loop increases in tension in an intermediate rack then a shock wave occurs, that is there may be a lapping over of requirements for film reserve from the same rack.

Another method suggested is to have drive rollers or tires extending above the top spools in each rack. The top spools are kept in almost constant engaging contact with the drive roller, (see U.S. Pat. Nos. 2,584,293 and 2,939,700). When film tension builds up or increases in a loop, the top spools are drawn away from the drive roller with the feed rate of film remaining constant.

This method uses a positive drive, that is the spools are constantly engaged with the rollers and when the tension increases the spools are withdrawn. Generally, the size of the rollers used in the racks will get progressively smaller towards the end of the processing machine and the rollers will begin to develop wear patterns after a period of time. In some designs, springs are used to maintain tension. An inherent disadvantage in the use of springs is in the loss of elasticity in the springs after a period of use. Another obvious disadvantage is a lack of full self-compensation which necessitates the graduation of the rubber drive rollers throughout the processor.

Generally, in designs of the latter method there is a hesitating effect or lag time in corrective response which limits the processing speed.

These and other methods are not entirely satisfactory for the processing of the narrow film where high speeds of 100 to 200 feet per minute are desired, or when the spray process or the new viscous method of developing or treating the film is used instead of the total immersion process, since the corrective response to changes in film tension is not fast enough to maintain the constant film tension within a rack necessary for economical processing speeds.

SUMMARY OF THE INVENTION

I have discovered a new and improved film transport device for conveying motion picture film or other thin strip, or narrow width material at high speeds and at uniform film tension. My device is economical to build and operate, generally requires less maintenance than the devices now being used, operates safely at high speeds, and has an immediate corrective response between racks with a minimal reserve elevator to maintain substantially uniform film tension within each rack at all times. My new and improved device includes a first rectangular rack having a first fixed shaft, with a plurality of primary overdriven spools thereon which shaft is driven by any conventional motive means. Positioned within the rack and adapted and disposed for reciprocating upward and downward movement within the rack and for limited lateral movement is a frame which includes a first upper and a second lower shaft. One of the shafts contains a plurality of secondary elevator spools which together with the spools in the rack permits the film to form a loop to loop arrangement within the rack. The other frame shaft is a continuously driven floating shaft which has secured thereto two drive rollers.

Uniform film tension is maintained by the movement of the frame within the rack so that the continuously driven drive roller secured to the floating rotor shaft is engaged and disengaged within the loop portions of the spools. A negative or demand type drive is employed in my invention. When the tension in the film increases additional driving force is employed to eliminate the tension. In a positive drive under the same condition the driving force is discontinued to correct the tension.

In one embodiment the primary overdriven spools are located on the rack and the drive rollers disposed directly beneath said spools on the feed side of the rack or under the output side of the rack or preferably under both the feed and output primary spools while the elevator spools in the lower portion of the frame forms the loop to loop arrangement within the rack.

In my device when the film tension on the feed side of the rack increases, the frame within the rack moves up and to the side and the drive roller contacts the primary overdriven spool on the feed side imparting a peripheral positive overdriving force to the said spool increasing the rate of film feed. This overdrive on the primary spool increases the film feed rate and prevents the tension from increasing in the loops within the rack. The rack has a minimal elevator reserve. As tension increases, it is distributed over several loops on the feed side of the frame which minimizes the increase in tension in each individual loop. When a first rack requires reserve film from a second rack the second rack provides enough film with its minimal reserve elevator to correct the tension in the first rack and does not have to draw upon a third rack for reserve film, thus preventing shock waves back to the feed.

Also, the frame within the rack can be adjusted to respond to very slight increases in tension. Because the film processes more smoothly in my invention, a cleaner final product is produced free from scratches, abrasions and marks. When the tension caused by the proceeding rack abates, the frame descends by gravity due to the overdrive to its normal position and contact between the drive roller and the primary overdriven feed spool is disengaged. In this manner the changes in tension between racks is instantly corrected while maintaining substantially uniform tension of film within the rack.

My invention eliminates many of the difficulties associated in the past with the methods used to maintain constant tension of film in a rack during processing by using a continuously driven floating shaft and employing a negative drive principle to achieve an immediate corrective response with a minimal elevator reserve to changes in film tension between racks in film processing equipment, while maintaining substantially constant tension in the consecutive side by side loops of film.

It is therefore an object of my invention to provide an improved transport device for strip material such as 8 mm. movie film which overcomes many of the difficulties associated in the past with methods for maintaining substantially constant tension of strip material in a rack.

Another object of my invention is to provide a transport device for strip material which has a rack and a continuously driven floating shaft on a frame within the rack with drive rollers secured thereto employing a negative drive within the loops to provide an immediate corrective response to changes in film tension between racks.

A further object of my invention is to provide a transport device for strip material wherein the rack includes a set of primary overdriven spools and a frame is contained within the rack disposed for vertical and lateral movement in relation to the rack providing for an extremely fast rate of corrective response in relieving tension in strip material being processed between racks with a minimal reserve elevator that prevents shock waves going back to the feed section.

An additional object of my invention is to provide a film transport device for strip material to obtain a uniform feed rate and immersion residence time of the strip material being processed through a rack. These and other objects of my invention will be apparent to those persons skilled in the art from the accompanying drawing and the more detailed description of my invention wherein:

Figure 1:
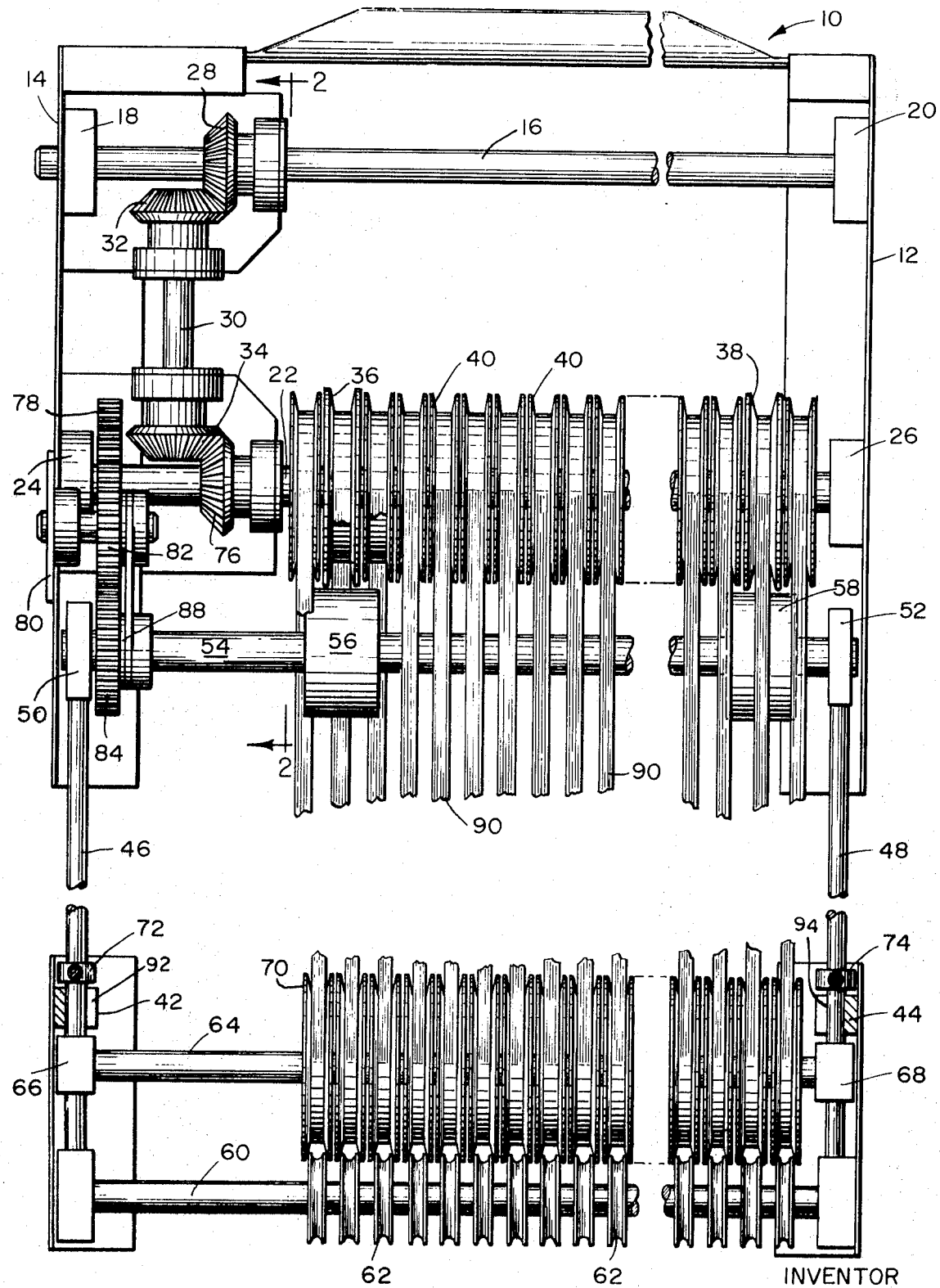
FIG. 1 is a cross-sectional longitudinal view of my invention.

DESCRIPTION OF THE PREFERRED
EMBODIMENT(S)

Briefly, my invention comprises a rack having horizontally aligned sides, a rotor shaft journaled to the sides of the rack at the top thereof with a set of upper primary overdriven spools for carrying and guiding the film on the shaft which spools are overdriven by the said rotor shaft. Within the rack is a frame with vertical support rods horizontally aligned on either side thereof. The frame moves in a reciprocating manner vertically and laterally in relation to the rack. This frame has two lower shafts. The bottom shaft is fixed to the support rods and passes through a series of discs which are affixed thereto. The upper shaft is journaled to the vertical rods and passes through the center of the secondary elevator spools which are rotatably free and guide the film during processing. The primary overdriven and secondary elevator spools are so placed as to define consecutive loops of film in side by side relation. The edge of the discs on the lower shaft are slideably inserted between the peripheral edges of the secondary elevator spools on the upper shaft, whereby if the film becomes slack, it cannot disengage from the spools.

Journaled to the top of the frame and below the primary overdriven spools is a floating continuously driven shaft which passes through two drive rollers one at either end of the shaft. This shaft and the rotor shaft which drives the primary overdriven spools and both are continuously driven by the same motive means. The peripheral edges of the drive rollers lie just below two primary spools which spools are of a different material and have wider edges than the other primary spools to create a greater co-efficient of friction with the drive roller and to prevent wear patterns in the surface of the drive roller.

In operation when the tension in the film in the incoming or feed side increases the frame moves upward and to the side. The tension in the loops remaining essentially the same and the primary overdriven spools still being overdriven by the rotor shaft. The drive roller on the feed side contacts the primary overdriven spool on the feed side and imparts a peripheral positive overdrive to the spool which drive increases the rate of film feed into the rack. When the tension is relieved, the frame floats down by gravity to its original position. The normal tension in a strand of film is about 4 ounces. The frame is sensitive to any slight increase in tension, e.g. about 1 ounce, caused by the preceding rack and this results in the immediate corrective response. This immediate corrective response causes the drive roller on the floating shaft to positively overdrive the primary overdriven feed spool to increase the rate of feed and relieve the tension. This coupled with the fact that the primary overdriven spools are overdriven regardless of what position the frame is in, and the negative drive feature, that the friction drive roller only contacts the primary spool when tension increases, results in maintaining substantially constant tension of the film in the rack at all times. Also the slight upward and lateral movement of the whole frame maintains substantially constant tension in the loops of film more so than if the whole frame moved horizontally. In the latter situation, slack is created in the loops on the output side. The lateral movement prevents or inhibits this.

The gear affixed to the rotor shaft which drives the primary spools transmits its motive force through two meshed gears or other driving means which are secured to the rack. The second of these two gears is meshed with a third gear which drives the floating continuously driven shaft and these second and third gears are joined by an arm which is rotatably attached to each thereby providing the means to transmit motive force and allow the floating continuous driven shaft freedom of movement. The gear ratios are arranged so that the drive roller will rotate faster than the primary feed spool to create the necessary positive overdrive.

The drive roller on the right or non-feed side of the floating continuously driven shaft is not utilized when the frame floats up to correct an increase in tension. The lateral movement of the frame only brings into contact the friction drive roller and the primary spool on the feed side of the rack. It is placed there is provide flexibility in my rack in order that the feed side may be changed in a particular operation without removing the rack.

My invention will be described in connection with the processing of narrow 8 mm. movie film, wherein the rack has primary overdriven and secondary elevator spools which spools define consecutive side of side loops of film.

Referring to the drawing, my invention comprises in combination, a rack 10 having horizontally aligned sides 12 and 14, a main rotor shaft 16 journaled to either side at the top of said rack, and a bearing block 18 through which one end of the rotor shaft 16 passes through and a bearing block 20 in which the other end of the rotor shaft 16 is secured and motive or other means (not shown) to drive the rotor shaft 16. A primary rotor shaft 22 is journaled to bearing blocks 24 and 26 on either side of the rack 10 and located below the rotor shaft 16. A bevel gear 28 is secured to one end of the shaft 16. A drive shaft 30 has bevel gears 32 and 34 secured to either end thereof. Primary overdriven spools 36, 38 and 40 carry and guide the film through the rack spools. The rotor shaft 22 passes through and creates and overdrive on the primary spools. Support plates 42 and 44 are secured to either side of the rack and are characterized by slots 92 and 94.

A frame is contained within the rack 10 having two hollow vertical support rods 46 and 48 which pass through slots 92 and 94 in support plates 42 and 44. Bearing blocks 50 and 52 are secured to the top of said support rods and a rotor shaft 54 is journaled to the said bearing blocks. Drive rollers 56 and 58 are secured to either end of the rotor shaft 54 to overdrive the primary spools 36 and 38. A shaft 60 is secured to the lower ends of the vertical support rods, and passes through discs 62 which are secured thereto. A rotor shaft 64 is located above the shaft 60 and journaled to bearing blocks 66 and 68 which are secured to the vertical support rods. Elevator spools 70 for guiding the film are rotatably secured to the rotor shaft 64. Collars 72 and 74 are secured to the vertical support rods 46 and 48 in an adjustable manner over the support plates 42 and 44 to prevent the frame from descending below a predetermined level.

Figure 2:
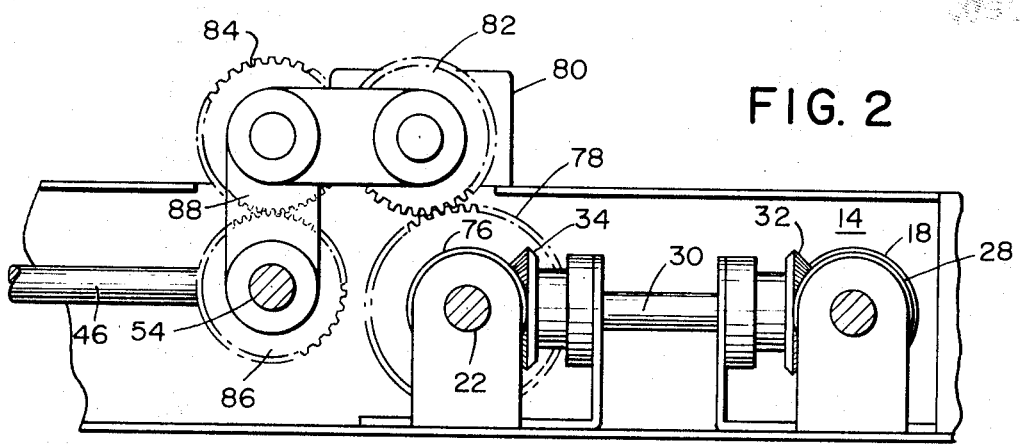
FIG. 2 is a cross-sectional view taken along the lines 2—2 of FIG. 1 showing the gear arrangement.
Figure 3:
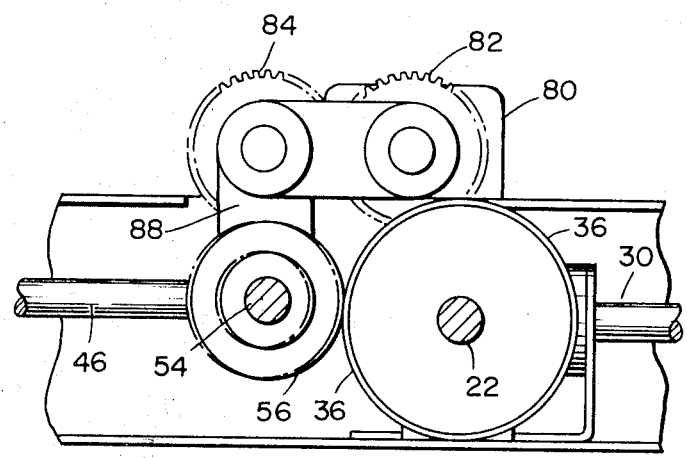
FIG. 3 is a fragmentary cross-sectional side view taken along lines 3—3 of FIG. 4 showing the drive roller in engagement with the primary overdriven feed spool.

As shown more clearly in FIGS. 2 and 3, a bevel gear 76 is secured to one end of the rotor shaft 22 and is meshed with bevel gear 34. A spur gear 78 is also secured to the rotor shaft 22. The gears 82 and 84 are affixed to a support plate 80. A spur gear 86 at the end of the floating rotor shaft 54 is meshed with spur gear 84 and held thereto by an arm 88. This combination of gears transmits motive force from gear 78 through gears 82 and 84 to gear 86 to drive the floating continuously driven rotor shaft 54.

In the operation of my rack 10, a film to be processed is threaded through the primary and secondary spools 40 and 70 to define consecutive side by side loops 90 of uniform size. The film is driven through these loops during processing entering the feed side and withdrawn from the output side of the rack. The rack 10 may be in a dry or wet chamber. A motive or other force not shown drives the main rotor shaft 16. This motive force is transmitted to the primary rotor shaft 22 through the bevel gear 32 down the shaft 30 to the bevel gear 76. The rotation of the primary rotor shaft 22 during processing is continuous. The center opening of the primary spools is slightly larger than the diameter of the shaft 22 and the continuous rotation of the shaft 22 imparts an overdrive to the primary spools which spools then in turn give an almost positive drive to the film. Bushings or bearings may also be used to create this overdrive on the primary spools. However, the use of bearings or bushings normally gives a high occurrence of failure or binding and are not desirable. The shaft 64 rotates freely in the bearing pads 66 and 68 and the elevator spools 70 which guide the film rotate freely about this shaft. The discs 62 are fixed to the shaft 60 which is secured to vertical support rods 46 and 48 and aligned side by side one each between the edges of each secondary spool. The edge of the disc is adjacent to the edge of the spool 70 and this prevents the film from falling out of the elevator spools.

Figure 4:
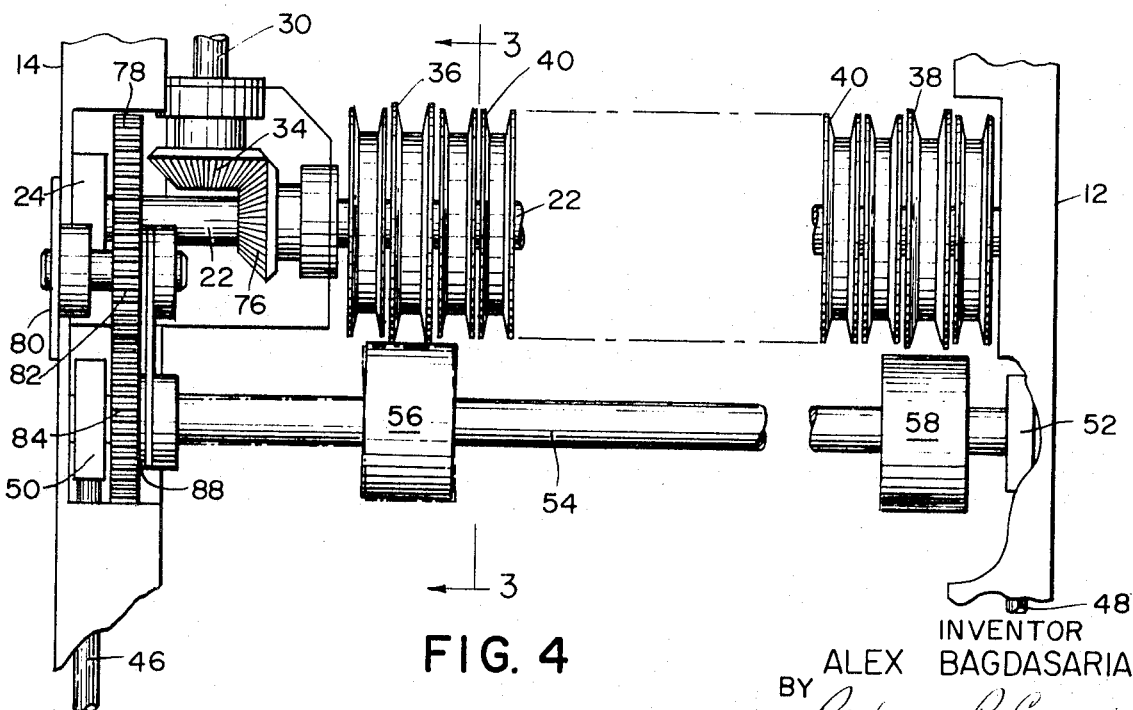
FIG. 4 is a fragmentary cross-sectional view showing the floating rotor shaft and the drive roller in cooperation with the primary overdriven spools.

During normal operations, the tension in each of the loops is about 4 ounces although any tension can be set. When the tension of the incoming film increases up to about 1 ounce, this exerts a pull on the frame. The frame moves up and to the side the drive roller 56 contacting the primary overdriven spool 36 and imparting a positive overdrive to the primary spool 36. This increases the feed rate into the rack relieving the tension and the frame floats back to its normal position, the collars 72 and 74 coming to rest on the support plates 42 and 44. The slots 92 and 94 allow the frame to move laterally to either side but as described, the frame moves to the left. This lateral movement insures that the friction drive roller 58 on the output side does not contact the primary spool 38 on the output side. The solid lines in FIG. 4 show the floating shaft in an energized state or when the tension in the incoming film is increased. The friction drive roller 50 is in engagement with the primary spool 36 on the feed side but the roller 58 on the output side is not in engagement with the primary spool 38. The dotted lines show the floating shaft in the static or normal operating position.

The lateral movement also minimizes the amount of tension variation within the loops to a much greater degree than if the whole frame moved horizontally. In strictly horizontal movement slack would be created in the loops on the output side. The lateral movement of my frame eliminates this slack in the loops on the output side when tension increases in the feed side. The immediate corrective response corrects the variation in tension between racks while maintaining substantially uniform tension within very close limits in the rack, because of the primary overdriven spools which convey the film are continuously driven, the negative drive principle, in which the friction drive roller only contacts the primary spool a small percentage of the time and the lateral movement of the frame.

When a first rack requires film from a second rack, the second rack is designed to supply the reserve film without seeking film from a third rack. The whole frame in the second rack moves up and laterally to the side when an increase in tension is created by the feed spool of the preceding rack. Therefore the film in each loop within the rack is available as reserve film. This is normally accomplished without the drive roller in the second rack engaging its own primary feed spool although it may contact the output spool. A third rack is not called upon to supply reserve to the second rack. This is the function of the minimal reserve elevator.

The vertical support rods are hollow. This is in order to vary the weight of the frame within the rack by inserting or withdrawing weight in the support rods. For a given film tension, say 4 ounces in a loop, to make the frame responsive to a slight tension variation of about 1 ounce if the frame is in solution it will need more weight than if it is in a dry tank. Of course the weight of the elevator and the exact percentage of overdrive varies with the size of the film and the speed of the machine.

My film transport has been described in particular in connection with processing through a motion picture developing machine, the narrow 8 mm. color film. However, my device may also be employed in carrying any type strip material and is particularly applicable to carry very narrow strip material at high speeds such as motion picture film, magnetic tape, paper strips, plastic film, fabric material, wire and the like.

My device has been illustrated using a single motive means to drive both the floating continuously driven frame shaft and the upper shaft of the rack, however, separate drive means may be utilized to drive each of these shafts as apparent to those persons skilled in the art.

Also, my device has been illustrated using two drive rollers. One drive roller may be used alone or two in combination as described or even three or more friction drive rollers may be used.

While my device has been described with the floating rotor shaft located below the primary overdriven spools and the drive roller coming into engagement with the lower segment of the primary spools, it is to be understood that the negative drive approach with the floating rotor shaft may be utilized having the drive roller directed toward a lower driven shaft or may be directed toward both upper and lower shafts.

Although my invention has been described in particular reference to the oscillation or lateral and vertical movement of a frame, my invention broadly includes the oscillatory movement of one of the two shafts carrying the spools, which concept may be employed in other embodiments. For example, the spools on the fixed shaft may or may not be overdriven and the spools on the oscillatory shaft may or may not be overdriven. However, it is preferable that at least one set be overdriven whether they are on a fixed or oscillatory shaft. Also, the floating drive shaft may be fixed if desired.

Figure 5:
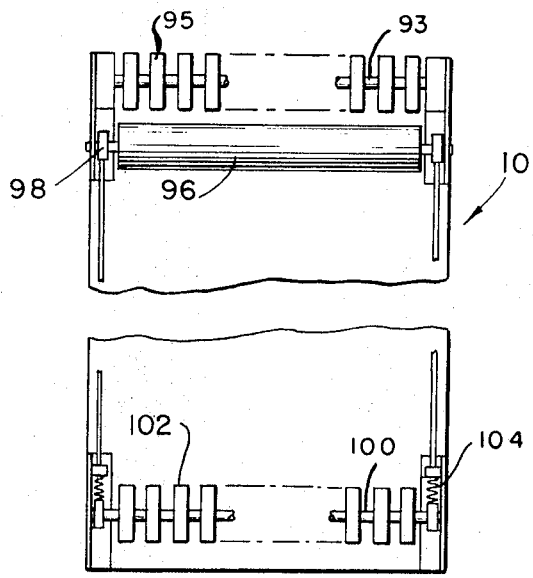
FIG. 5 is a schematic illustration of an alternative embodiment of my invention.

Referring to FIG. 5, a rack 10 is shown which comprises a first rotating shaft 93 passing through a plurality of primary overdriven spools 95. Directly below the overdriven spools is a drive roller 96 which is secured to a fixed shaft 98. Disposed at the bottom of the rack and journaled to the sides thereof is a secondary shaft 100 which passes through a plurality of idle spools 102. As before, the film to be processed forms a loop-to-loop arrangement and is supported and carried by the primary and secondary spools.

The shaft 93 is secured to the frame in a movable manner whereby it may move vertically and laterally in reference to the drive roller 96. For example, the ends of the shaft 93 may move freely in tracks or the shaft may be spaced apart from the drive roller by springs which allow unrestricted vertical and lateral movement of the shaft. During the operation of this rack, an increase in film tension will cause the primary spools to oscillate in a manner as described before and contact the drive roller 96. The drive roller will impart an overdrive to the spool which it contacts thereby increasing the amount of film available to relieve the tension. If desired, the secondary shaft may be biased downwardly by springs 104 to provide a breather for the film within the rack that is, the secondary shaft 100 with the springs is adapted to move vertically and/or laterally as desired to increase the amount of film available to relieve an increase in tension.

Although the oscillatory movement of a shaft having spools thereon has been described in reference to the movement of film through a rack by overdrive, the oscillatory movement of the shaft may be successfully employed in those machines utilizing other drives. That is, the segmental contact between the drive roller and the spools does not always have to be with overdriven spools. Idle spools may also be contacted by the driven roller and the drive roller may be on a fixed or a floating shaft.

Figure 6:
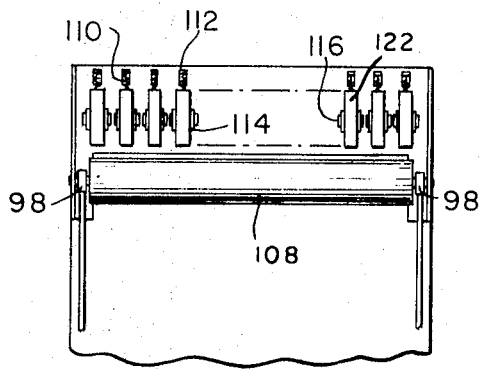
FIG. 6 is a schematic illustration of a further embodiment of my invention wherein one set of spools is adapted to deflect individually to strike the friction drive roller.
Figure 7:
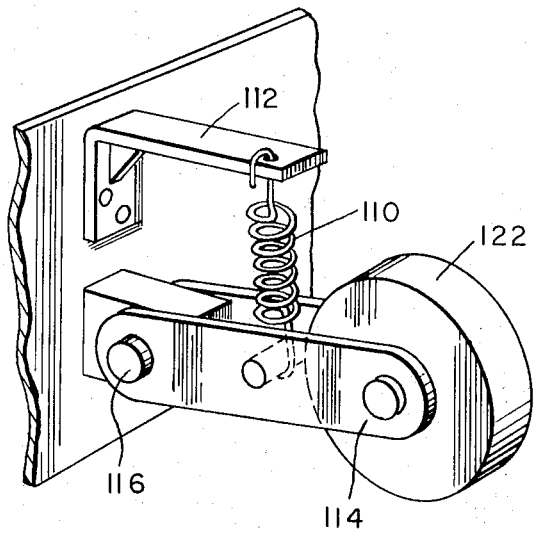
FIG. 7 is an enlarged sectional view of the spools of FIG. 6.

In FIG. 6, a schematic diagram is shown wherein each of the spools 122 function individually. Each of the spools is biased upwardly from the drive roller 108 by a spring 110 which is secured to the support element 112 and the rocker arm 114 as shown in FIG. 7. The rocker arm 114 is pivotally secured to the shaft 116 and the spool 122. When an increase in film tension occurs, the individual spool will move downwardly and strike the drive roller 108 which is secured to the rack in a fixed manner. At the same time, the shaft 118 will oscillate to provide the minimal elevator reserve as described before. The ends of the shaft 118 are secured to springs 120 which allow for the unrestricted movement of the shaft 118 and therefore the spools 122. Also, spools 124 secured to a continuous shaft which individually deflect in response to an increase in film tension, such as described in U.S. Pat. 3,380,678, may be used in lieu of the spools 95. These spools may function as idle spools or overdriven spools.

Having described my invention what I now claim is:

1. An improved transport device for strip material such as motion picture film which device comprises in combination:

(a) a rack having a first shaft and a first set of spools thereon;

(b) a second shaft secured to the rack and adapted for oscillatory motion in reference to the first shaft and having a second set of spools thereon whereby the film to be processed is in a loop-to-loop arrangement supported by the first and second sets of spools;

(c) a continuously driven shaft secured to the rack and disposed between the first and second shafts;

(d) at least one friction drive roller secured to the continuously driven shaft for rotation therewith the outer periphery of the drive roller normally being spaced apart from one set of spools;

(e) means to drive the friction drive roller on the continuously driven shaft at a speed faster than the set of spools from which it is spaced apart;

(f) means to overdrive at least one set of spools wherein all of said spools on said shaft having said one set of spools thereon are driven with substantially constant torque to move the film through the rack whereby the second shaft oscillates in response to an increase in film tension and the drive roller engages in discontinuous driving contact with at least one of the spools to impart a further rotational driving force to said one spool thereby relieving the increase in film tension.

2. The device of claim 1 wherein the spools on the first fixed shaft are idle spools, and the spools on the second shaft are overdriven and spaced apart from the continuously driven shaft.

3. An improved transport device for strip material such as motion picture film which device comprises in combination:
   (a) a rack having a first fixed shaft secured to the rack and a plurality of primary spools thereon which are overdriven;
   (b) a frame disposed within the rack and adapted for vertical and lateral reciprocating movement independent of the rack the frame having:
       (1) a second shaft and a plurality of secondary elevator spools thereon whereby the film to be processed is in a loop-to-loop arrangement supported by the primary overdriven and secondary elevator spools;
       (2) a floating continuously driven shaft;
       (3) at least one friction drive roller secured to the floating driven shaft for rotation therewith, the outer periphery of the drive roller being normally spaced apart from the primary overdriven spools; and
   (c) means to drive the first fixed shaft and the floating driven shaft, including means to drive the friction drive roller on the floating driven shaft at a speed faster than the primary spools whereby the frame moves vertically and laterally in response to an increase in film tension and the drive roller engages in discontinuous driving contact with a segmental portion of at least one primary overdriven spool to relieve the increase in film tension.

4. The apparatus of claim 3 wherein the primary spools include a feed spool and the drive roller is positioned for segmental contact with the feed spool.

5. The apparatus of claim 3 which includes two drive rollers and the primary spools include a feed spool and an output spool and each drive roller is positioned for segmental contact beneath the feed spool and the output spool.

6. The apparatus of claim 3 wherein the contacting surface of the drive roller is of a different material than that of the primary overdrive spool which it engages.

7. The apparatus of claim 3 wherein the frame includes two horizontally spaced vertical support rods, retaining means are secured to each side of the rack, and the retaining means include slots in which said rods are positioned and two collars are secured to the support rods above the retaining means whereby limited movement of the frame within the rack is allowed during operation.

8. The apparatus of claim 3 wherein the drive roller is wider than the primary overdriven spool it comes into driving contact with.

9. The apparatus of claim 3 wherein the first fixed shaft which overdrives the primary spools is located in the upper portion of the rack and the floating driven shaft is located in the upper portion of the frame and located directly below the first fixed shaft.

10. The apparatus of claim 3 wherein the drive means includes a separate drive shaft journaled to the sides of the rack and located at the top thereof and the first fixed shaft is journaled to the sides of the frame and located below the shaft.

11. An improved transport device for strip material such as motion picture film which device comprises in combination:
   (a) a rack having a first fixed shaft and a plurality of primary spools thereon which are overdriven, the primary spools being aligned side by side each surrounding the first fixed shaft;
   (b) retaining means secured to either side of the rack each characterized by a slot therein;
   (c) a frame disposed within the rack and adapted for vertical and lateral reciprocating movement independent of the rack, the frame having:
       (1) two horizontally spaced vertical support rods positioned in the retaining means;
       (2) collars secured to the support rods above the retaining means;
       (3) second shaft journaled to each of the support rods and a plurality of second elevator spools thereon aligned side by side each surrounding the second rotor shaft whereby the film to be processed is in a loop-to-loop arrangement supported by the primary overdriven and the secondary elevator spools;
       (4) a third shaft secured to the support rods and disposed below the second rotor shaft, including discs aligned side by side each disc surrounding the third shaft and aligned under each secondary spool;
       (5) a continuously driven shaft journaled to the support rods and located just below the primary overdriven spools at least two friction drive rollers secured to the continuously driven shaft for rotation therewith the outer periphery of the drive rollers being normally spaced apart from the primary overdriven spools;
   (d) means to drive the first fixed shaft and the continuously driven shaft including means to drive the friction drive roller on the continuously driven shaft at a speed faster than the primary spools which means also includes a drive shaft journaled to the sides of the rack and located at the top thereof.

12. A method of transporting film through a motion picture film processing machine having a first fixed set of spools for conveying and guiding the film, a second set of movable spools for guiding the film and a continuously driven shaft, which method comprises in combination:
   (a) feeding film to be processed to a film rack between the fixed and movable spools so as to provide a plurality of loop-to-loop arrangements for film within the rack;
   (b) moving film through the loop-to-loop arrangement and from the rack by overdriving at least one of set of spools at substantially constant torque;
   (c) oscillating the movable set of spools in relation to the fixed set of spools when an increase in tension in the film occurs;
   (d) contacting a segmental portion of the spools guiding the loop-to-loop film material in the rack by rotational overdriving force to impart a positive overdrive to the film; the positive overdrive engaging the spools when film tension in the loops is not maintained in a uniform mannner.

13. A method of transporting film through a motion picture film processing machine having primary overdriven spools for conveying and guiding the film, movable secondary spools for guiding the film and a floating drive shaft, which method comprises in combination:
   (a) feeding film to be processed to a film rack between the primary and secondary spools so to provide a plurality of loop-to-loop arrangements for film within the rack;
   (b) moving film through the loop-to-loop arrangement and from the rack;
   (c) driving the film through the rack by overdrive;
   (d) oscillating the secondary spools and the floating drive shaft in relation to the primary spools when an increase in tension in the film occurs; and
   (e) contacting a segmental lower part of the spools supporting the loop-to-loop film material in the rack by rotational overdriving force to impart a positive overdrive to the film the positive overdrive engaging the spools when film tension in the loops is not maintained in a uniform manner.

14. The method of claim 13 wherein the rack includes a feed side and an output side and the positive overdriving force only contacts a segmental lower portion of the overdriven spool on the feed side of the rack.

15. The method of claim 13 wherein the positive overdriven force is positioned to impart a positive overdrive to the spools on the feed and the output sides of the rack.

16. A transport device for strip material such as motion picture film which comprises:
  (a) a rack;
  (b) a first set of spools;
  (c) means to secure said first set of spools to said rack;
  (d) a second set of spools;
  (e) means to secure said second set of spools to said rack whereby the film to be processed is in a loop-to-loop arrangement supported by the first and second sets of spools;
  (f) a continuously driven shaft secured to the rack;
  (g) at least one friction drive roller secured to the continuously driven shaft for rotation therewith, the outer periphery of the drive roller normally being spaced apart from one set of spools;
  (h) means to drive the friction drive roller on the continuously driven shaft at a speed faster than the set of spools from which it is spaced apart; and
  (i) means to overdrive at least one set of spools wherein all of one set of said spools are driven with substantially constant torque to move the film through the rack whereby in response to an increase in film tension the drive roller engages in discontinuous driving contact with at least one spool of one of the sets of spools to impart a rotational driving force to at least one of said engaged spools thereby relieving the increase in film tension.

17. The device of claim 16 wherein the means to secure the second set of spools to the rack includes a shaft.

18. The device of claim 17 wherein said shaft is secured to the rack in a movable manner.

19. The device of claim 16 wherein the means to secure the first set of spools to the rack includes a shaft.

20. The device of claim 19 wherein said shaft is secured to the rack in a movable manner.

21. The device of claim 16 wherein the first set of spools are overdriven.

22. The device of claim 16 wherein the friction drive roller is spaced apart from the overdriven spools.

23. The device of claim 22 wherein the overdriven spools are secured to the rack in a movable manner whereby when an increase in film tension is felt within the loop-to-loop arrangement, the overdriven spools move causing engagement of the spools with the friction drive roller.

24. The device of claim 23 wherein the means to secure the overdriven spools to the rack includes a shaft such shaft passing through the overdriven spools.

25. The device of claim 22 wherein the continuously driven shaft is secured to the rack in a movable manner whereby when an increase in film tension is felt within the loop-to-loop arrangement, the friction drive roller secured to the continuously driven shaft moves causing engagement of the roller with the overdriven spools.

26. A method of transporting strip material which comprises:
  (a) feeding strip material to be processed to a rack between first and second sets of spools so as to provide a plurality of loop-to-loop arrangements for the strip material within the rack;
  (b) overdriving at least one set of spools at substantially constant torque to move the film through the loop-to-loop arrangement and from the rack;
  (c) contacting a segmental portion of the spools guiding the loop-to-loop film material in the rack by rotational overdriving force to impart a positive overdrive to the spools and thereby the film when an increase in tension in the loop-to-loop arrangement occurs when the film tension in the loop is not maintained in a uniform manner.

27. The method of claim 26 which includes moving at least one set of spools in response to the increase in film tension wherein a segmental portion of said spools are contacted by the rotational overdriving force.

28. The method of claim 27 which includes moving in response to an increase in film tension the overdriven set of spools.

29. The method of claim 26 which includes contacting a segmental portion of the overdriven spools.

30. The method of claim 26 which includes moving the overdriven spools into contacting engagement with the overdriving force.

31. The method of claim 30 which includes oscillating the overdriven spools to impart the rotational overdriving force to said spools.

32. The method of claim 26 which includes deflecting individually the spools of at least one of said sets in response to an increase in film tension whereby the rotational overdriving force is imparted to said deflected spools.

References Cited

UNITED STATES PATENTS

| | | | |
|---|---|---|---|
| 2,123,445 | 7/1938 | Yan Leuven | 242—55.01 |
| 2,584,293 | 2/1952 | Sachs et al. | 242—55.01 |
| 3,380,678 | 4/1968 | Feasey et al. | 242—55.01 |

GEORGE F. MAUTZ, Primary Examiner

U.S. Cl. X.R.

95—94 R